United States Patent [19]

Haley

[11] 4,168,056
[45] Sep. 18, 1979

[54] TORCH CUTTING MACHINE

[76] Inventor: Ernest K. Haley, 1210 Old Cannons La., Louisville, Ky. 40205

[21] Appl. No.: 951,802

[22] Filed: Oct. 16, 1978

[51] Int. Cl.² .............................................. B23K 7/10
[52] U.S. Cl. ....................................... 266/58; 266/60; 266/62; 266/69; 266/72; 266/73
[58] Field of Search ....................... 266/58, 60, 62, 69; 266/72, 73; 148/9 R

[56] References Cited

U.S. PATENT DOCUMENTS

| | | | |
|---|---|---|---|
| 1,582,033 | 4/1926 | Godfrey | 266/62 |
| 1,901,428 | 3/1933 | Anderson | 148/9 |
| 2,187,731 | 1/1940 | Davis | 148/9 |
| 2,329,270 | 9/1943 | Jones | 266/67 |
| 2,416,384 | 2/1947 | Gibson | 266/67 |
| 2,599,324 | 6/1952 | Forker | 148/9 |
| 2,631,028 | 3/1953 | Murr | 266/58 |
| 3,037,760 | 6/1962 | Arnault | 266/60 |
| 3,180,396 | 4/1965 | Eichelman et al. | 266/60 |
| 3,228,671 | 1/1966 | Lyons | 266/59 |
| 3,366,857 | 1/1968 | Jewell et al. | 266/60 |
| 3,464,684 | 9/1969 | Wilson | 266/67 |
| 3,908,973 | 9/1975 | Martin | 148/9 R |
| 3,934,861 | 1/1976 | Rahall | 148/9 R |
| 4,129,460 | 12/1978 | Brolund et al. | 148/9 R |

*Primary Examiner*—W. Stallard
*Attorney, Agent, or Firm*—David H. Semmes

[57] ABSTRACT

Torch cutting machines of the type embodying a plurality of torches adjustably mounted with respect to a moving conveyor, such that the torches may cut the flange and central web portions of I-beams, structural members and the like. The machine is characterized by the capability of vertically and longitudinally moving the torches upon a pivoted cantilever cutting arm which extends over a cutting area. The cutting torches embody independent vertical and lateral drive means and the cutting arm while in pre-set pivoted mode may be longitudinally and independently advanced with respect to the cutting area, such that complex straight mitre cuts, compound mitre cuts, copes notches and the like may be cut without special handling.

12 Claims, 11 Drawing Figures

TORCH CUTTING MACHINE

BACKGROUND OF THE INVENTION (1) Field of the Invention

Torch cutting of structural steel, particularly apparatus for cutoff and shaping of beam webs and flanges, columns and plates up to eight inches in thickness.

(2) Description of the Prior Art

In the prior art, there is shown the capability of supporting a plurality of cutting torches above and on either side of an I-beam and guiding the cut of said torches by means of a tracing element. However, there is not shown the capability of independently driving individual torches both in vertical and lateral planes, so as to simultaneously cut in various attitudes from both sides and from the top. Also, the prior art does not advance a pivoted cutting apparatus longitudinally through the cutting area.

A detailed description of prior art searching and selected patents is being submitted independently under the provisions of 37 C.F.R. 1.97.

SUMMARY OF THE INVENTION

In the present torch cutting machine a cutting arm may be pivoted upon a base, so as to extend over a longitudinal conveyor for I-beams and the like. A tracing element may be mounted upon the cutting arm at one end and at the other end two or more torches may be independently supported upon the arm, each torch including independent vertical and lateral drive means. A protractor plate is employed at the pivot of the arm, so as to accurately pre-set the cutting arm in the desired mitre position. The independent lateral and vertical drive mechanisms of the torches, as well as a longitudinal drive for the protractor plate, enable complex mitre cuts, notches, copes and the like without special handling of the I-beam or structural member and without manual setting of the torches.

DESCRIPTION OF THE PREFERRED EMBODIMENTS

Figure 1:
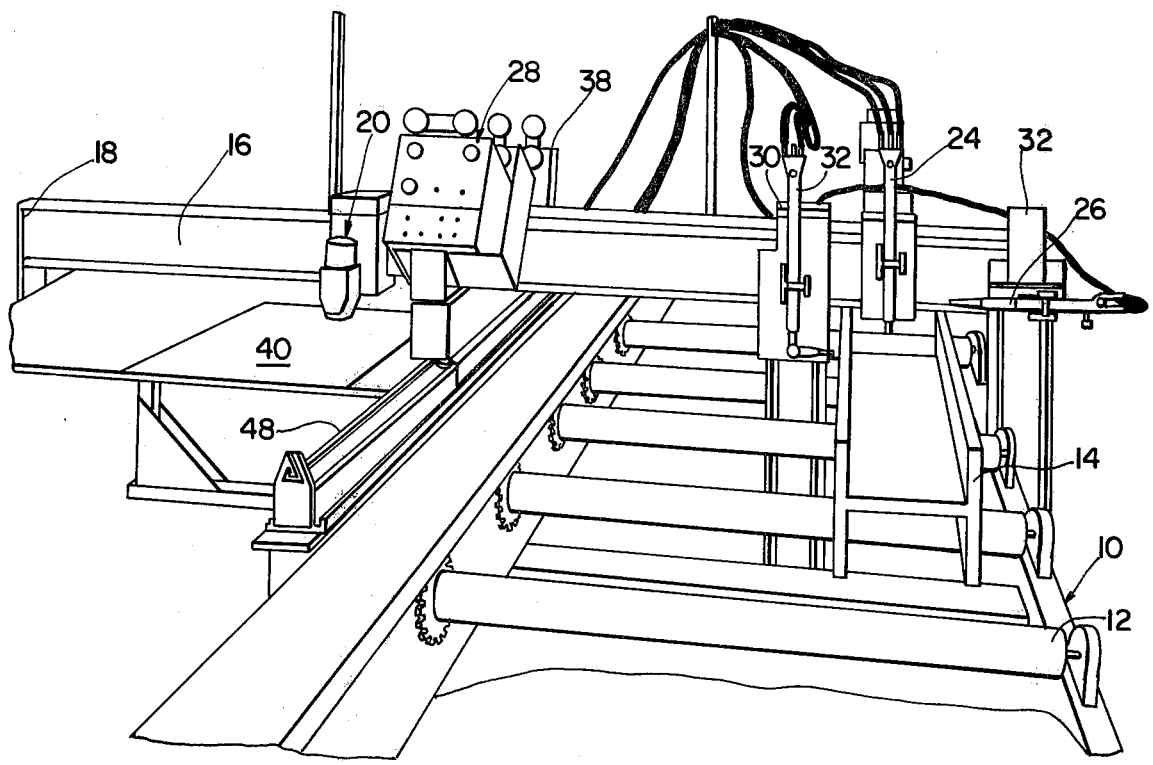
FIG. 1 is a perspective view of a flame cutting machine, showing an I-beam advanced to a position of cutting intermediate the three torches, as the tracing unit at the left follows a template.

In FIG. 1 a flame cutting machine is illustrated as consisting of longitudinal conveyor bed 10, having rotatably driven rollers 12 which have advanced I-beam structural member 14 intermediate flange cutting torches 22, 26 and beneath web cutting torch 24. The flange cutting torches are mounted pivotable cutting upon cantilever cutting arm 16, as is electronic tracer unit 20. Tracer unit 20 follows a suitable template 40 or the like. Cutting torch, cutting drive and longitudinal drive of arm 16 are controlled through console 28.

Figure 2:
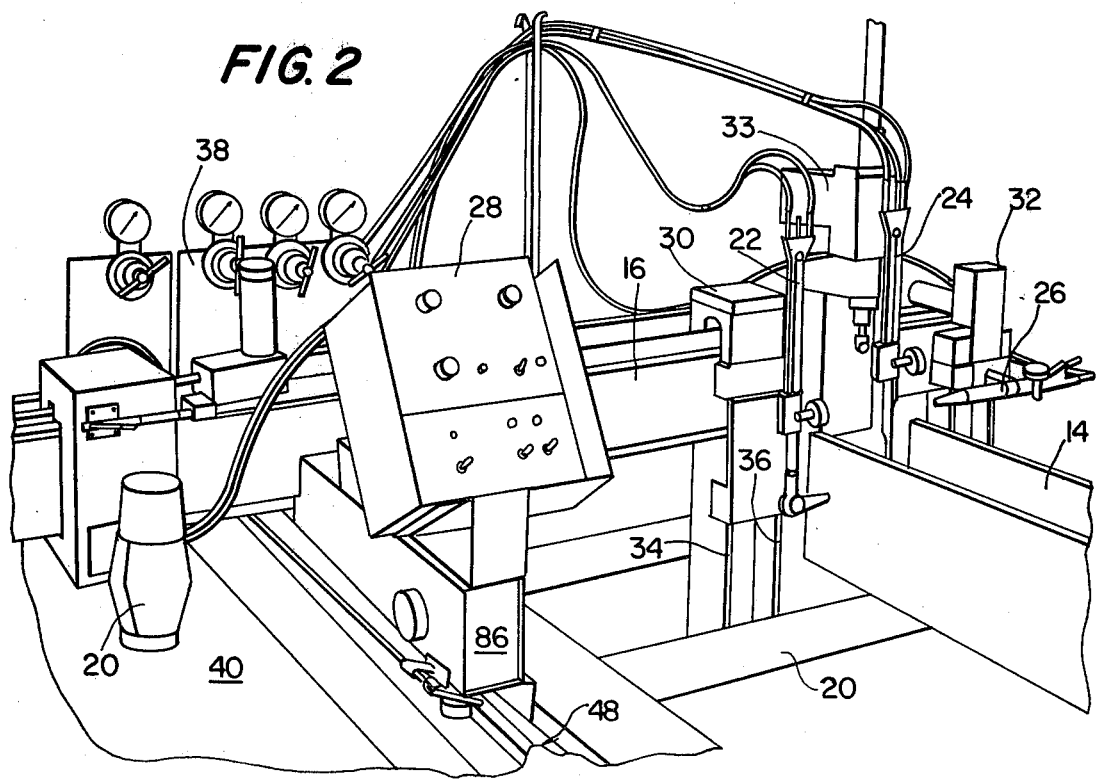
FIG. 2 is an enlarged, fragmentary perspective of the pivoted arm, showing tracing unit 20, oxygen-gas control 38, carriage and torch drive controls 28, flange torch 22, web torch 24 and flange torch 26.
Figure 7:
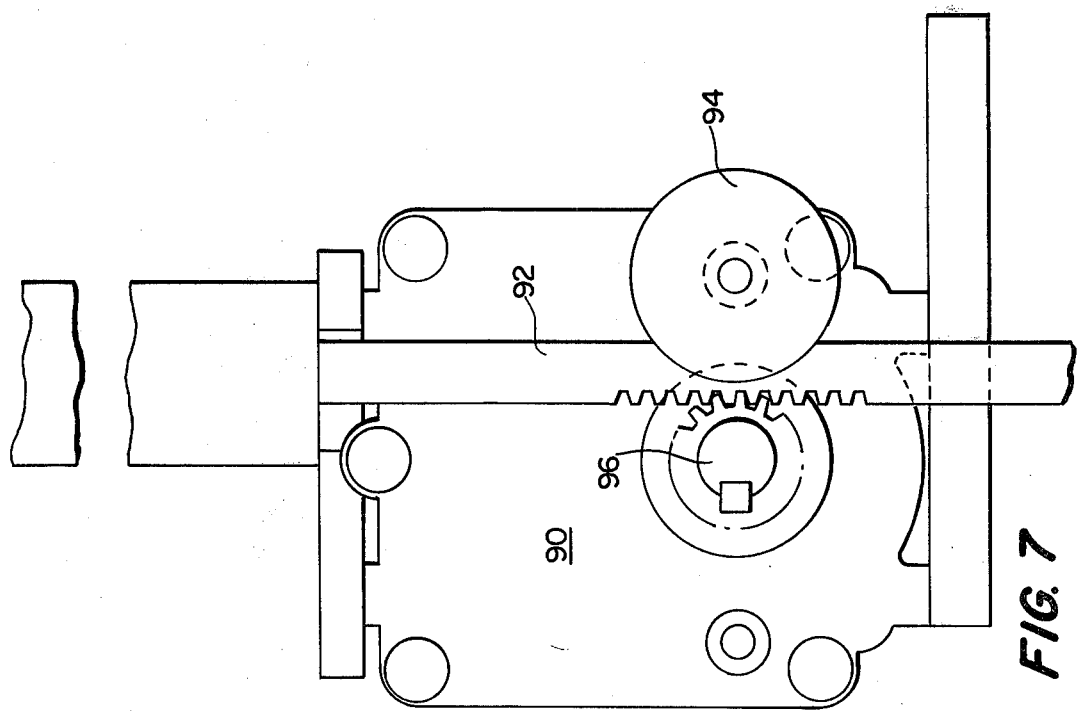
FIG. 7 is an enlarged fragmentary side elevation of the rack and pinion used as a vertical torch drive.
Figure 10:
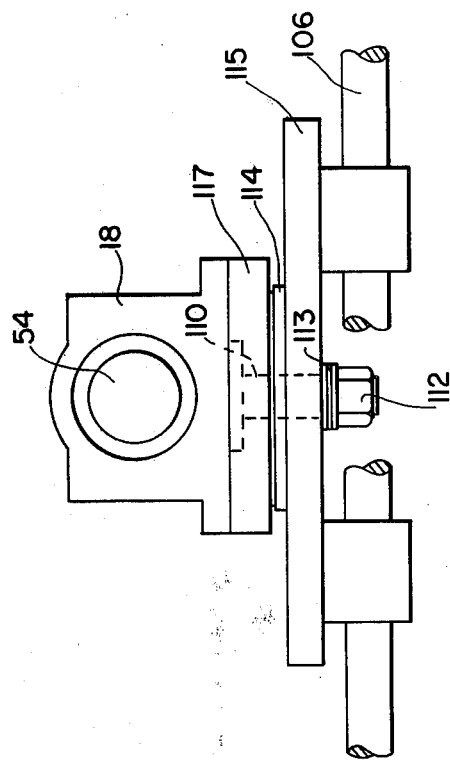
FIG. 10 is a fragmentary end elevation of the first track guide carriage consisting of the pillowblocks 18 secured to supporting plates by means of pivot pin 110, suitable bushings and a lock nut.

In FIG. 2 the cutting torches 22, 24 and 26 are further illustrated as laterally movable upon cutting arm 16 via housings 30, 32 and 33. Supports for flange cutting torches 22, 24 embody vertical rods 24, 36 which support plate 90 for reciprocable movement of the torches upon rack 92 (as illustrated in FIG. 7). Oxygen, acetylene and similar gas controls console 38 may also be positioned on cutting arm 16.

Figure 3:
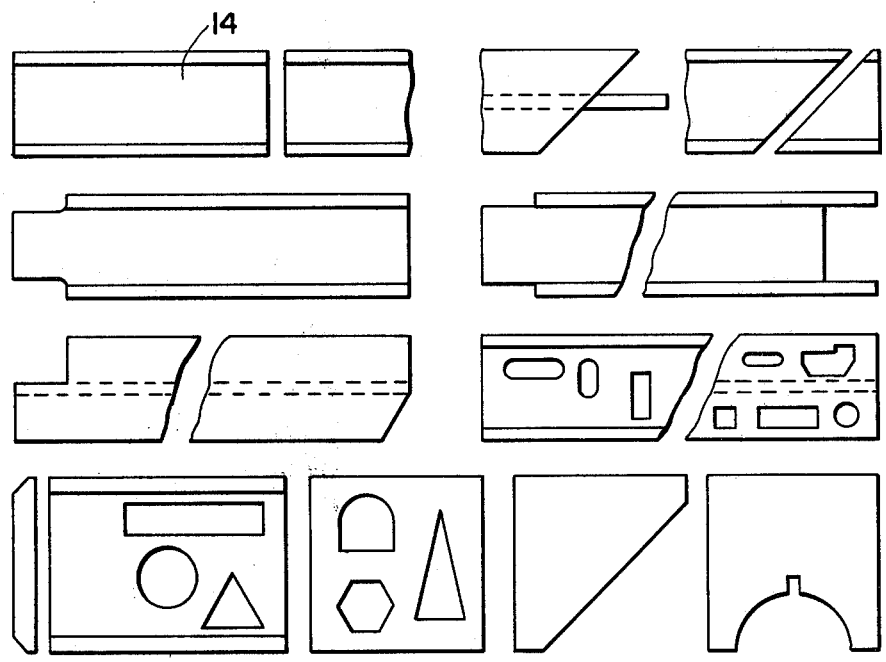
FIG. 3 is a schematic view showing a variety of straight cuts, mitre cuts, copes, notches and cutout patterns achievable with the present machine.
Figure 11:
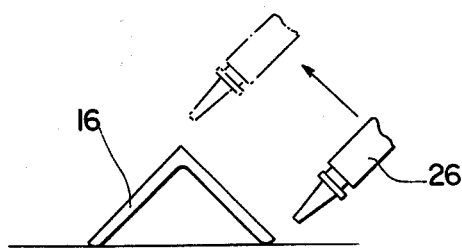
FIG. 11 is an end elevation showing a flange torch 26 pivotably positioned as during an angle mitre cut of channel iron 116.

In FIG. 3 there are illustrated the plurality of straight cuts, mitre cuts, copes, strips, notches, cutouts and patterns which may be achieved according to the present invention, without manual handling of either the cutting torches, I-beams or plates being cut.

Figures 4, 5:
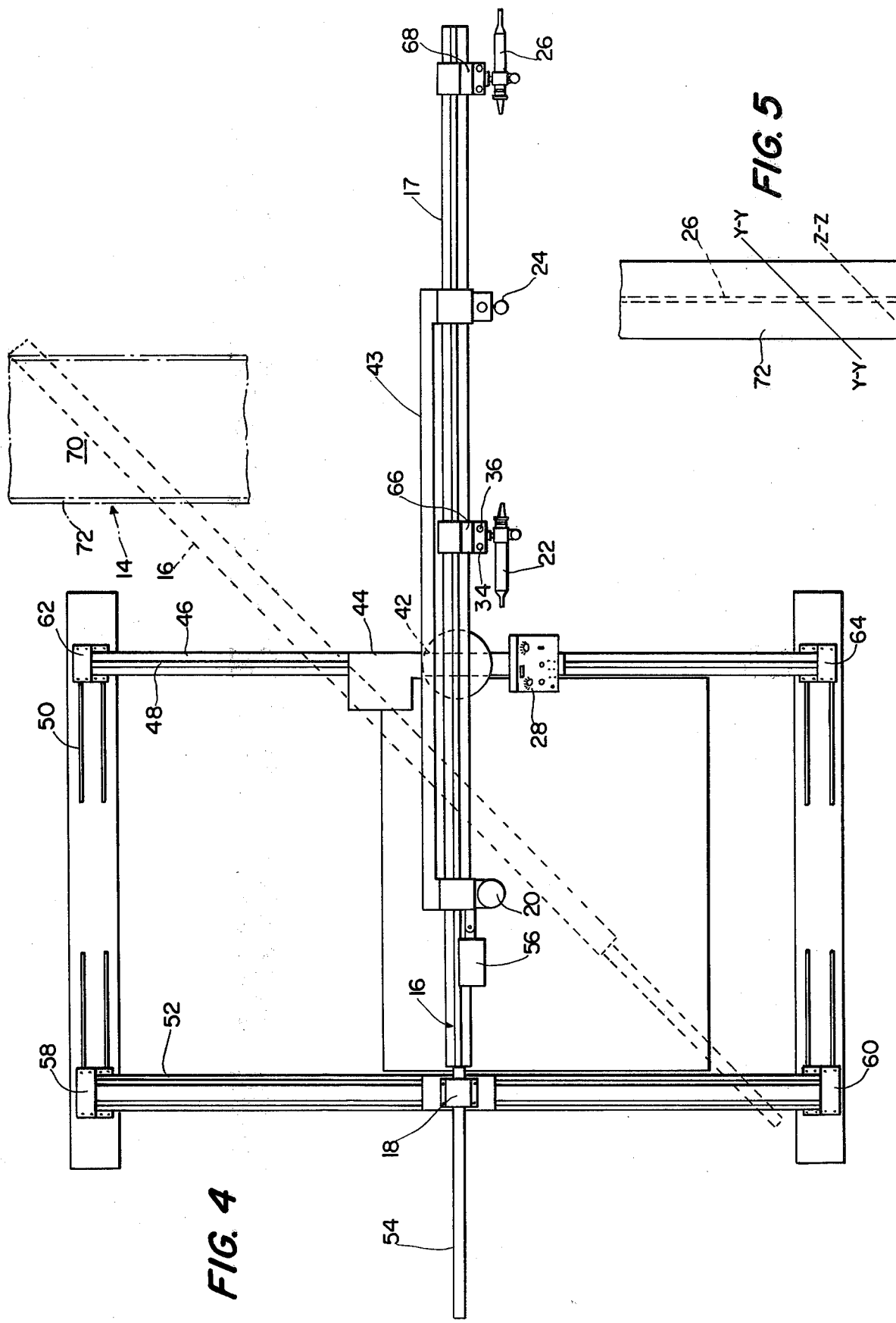
FIG. 4 is a top plan of the base unit, showing the first and second tracks for positioning the cantilever cutting arm, a 45 degree mitre cut pivot of the arm 16 being shown in phantom.
FIG. 5 is a side elevation of a compound mitre cut I-beam, showing the I-beam flange 70 and the far side mitre cut 2—2 in phantom.

In FIG. 4 there is illustrated fragmentarially I-beam 14 having flanges 72, 77 which have a straight mitre cut X—X, as the cutting arm 16 is pivoted to the 45 degree mitre position shown in phantom.

In FIG. 5 a similar 45 degree compound mitre cut may be made by torches 22, 26 along mitre cut lines Y—Y in the lefthand flange and mitre cut Z—Z in the righthand flange, web 70 being cut by middle torch 24.

Figure 6:
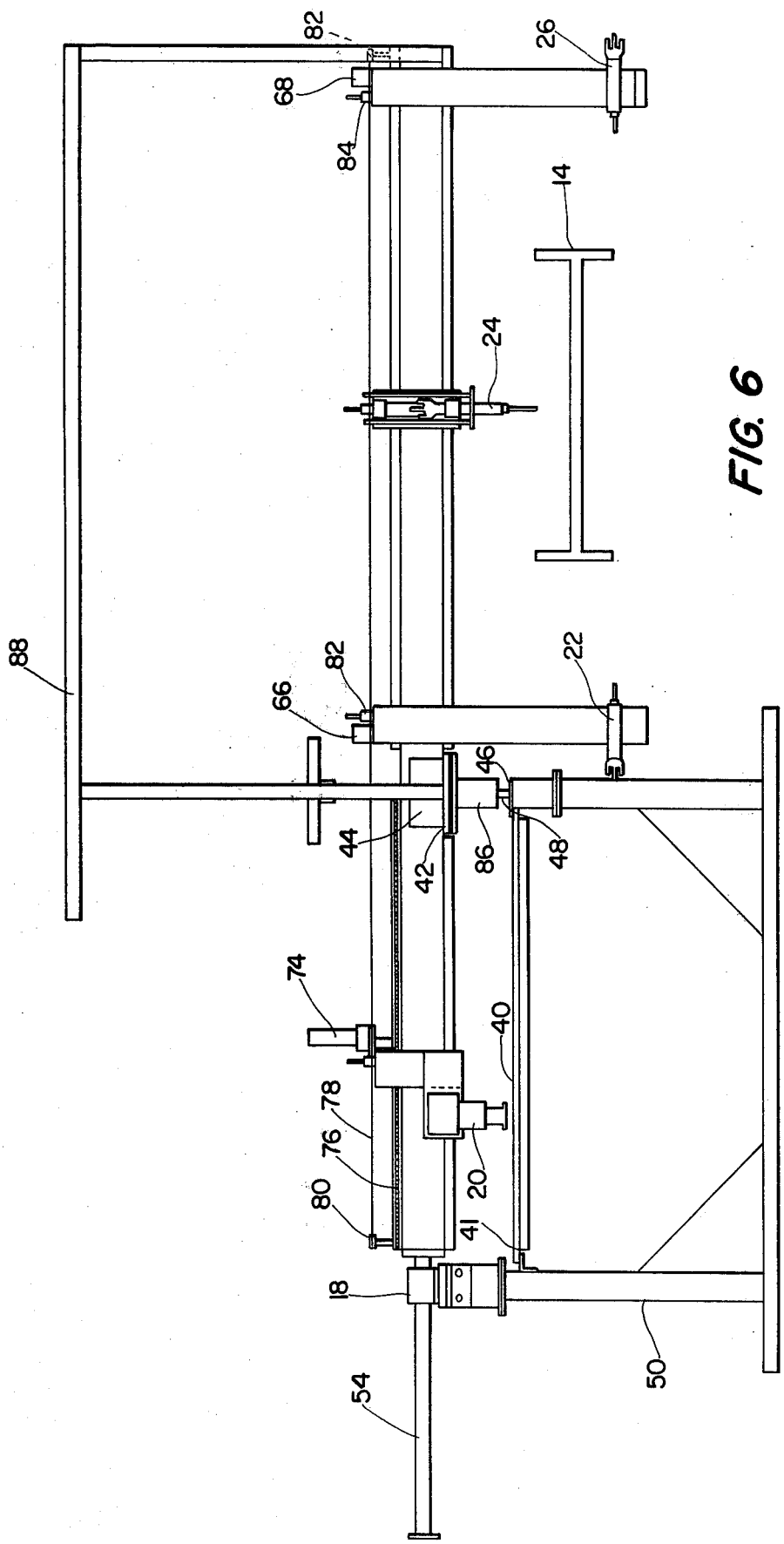
FIG. 6 is an end elevation of the torch cutting machine base, showing pivotal positioning of the cantilever torch arm with respect to the template and an I-beam being cut.

In FIG. 6 cutting arm 16 is shown as including a housing 17 positioned upon stainless steel rod 54 bearing in carriage plate 18 at the first or lefthand track 52 and protractor 42 mounted upon the second or righthand track 46. Tracks 46 and 52 and end plates 58, 60, 62 and 64 are mounted upon base frame 50.

As illustrated in FIG. 6 protractor 42 and carriage drive mechanism 44 rest upon central housing 86 engaging stainless steel $\frac{3}{4}"\times 1"$ track 48 mounted upon housing 46.

Figure 9:
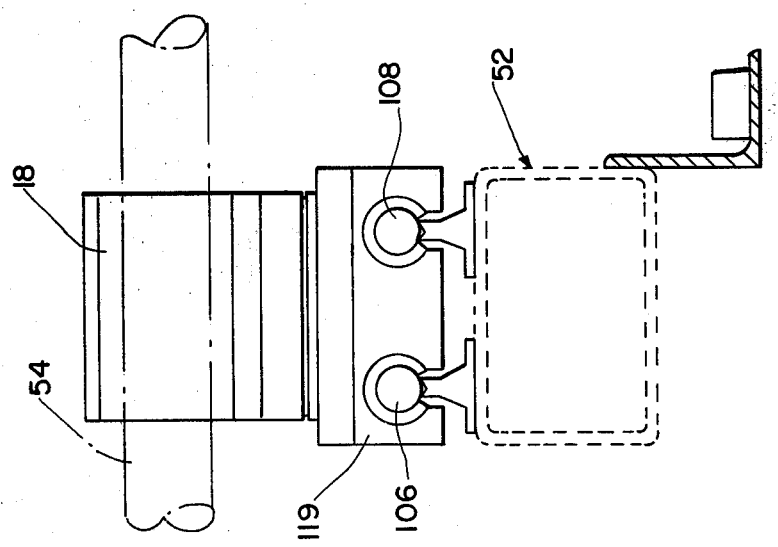
FIG. 9 is a transverse section taken through the guide carriage track, showing the pivot and guide carriage as well as the bearing rods 106, 108.

As illustrated in FIGS. 6 and 9 the carriage plate 18 consists of a pillowblock mounted upon the end of rod 54 and secured to a plurality of plates 110, 114, 115 and 117 by means of vertical one inch pivot pin 110 together with suitable bushings 113 and locknut 112. A Thompson ball bushing 119 may be employed to support the entire pivot carriage assembly upon dual Thompson one inch shafts 106, 108.

Figure 8:
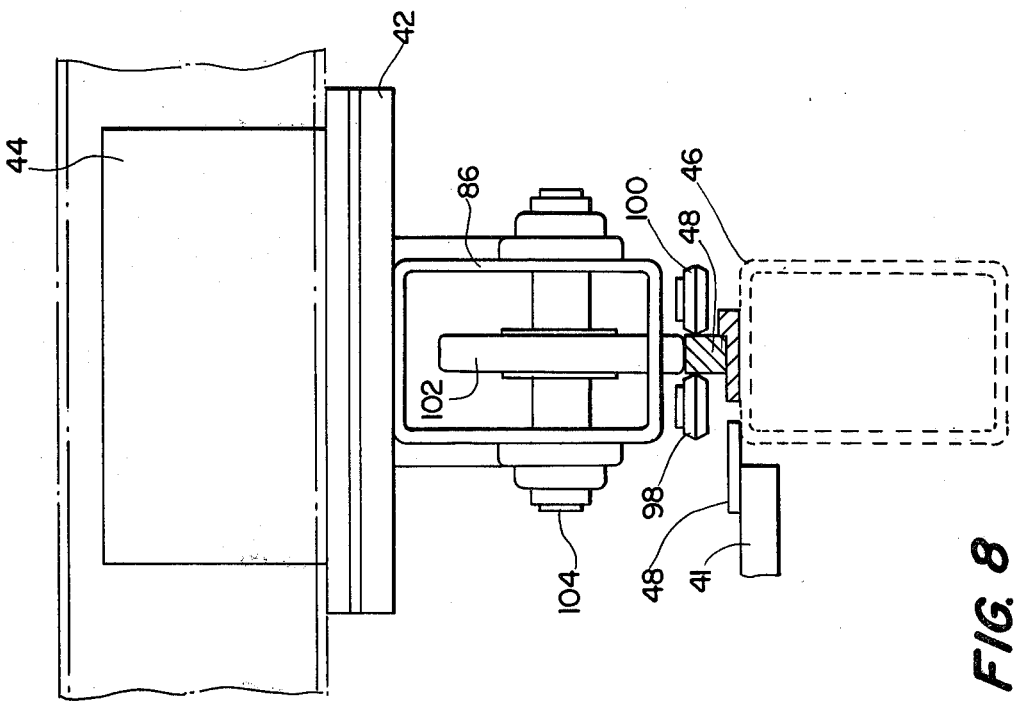
FIG. 8 is a fragmentary vertical section of the cutting arm protractor bearing on $\frac{3}{4}"\times 1"$ chromium steel track 48.

As illustrated in FIG. 8 carriage drive 44 and protractor plate 42 are mounted upon housing 86 which in turn includes a plurality of horizontal shafts 104 supporting vertical wheels 102, engaging stainless steel track 48 mounted upon housing 46. Pairs of horizontal guide rollers 98, 100 may be employed to assure constant bearing of wheel 102 upon track 48.

Protractor 42 may be pre-set manually on a zero—360° scale to assure proper positioning of flange torches 24 and 26 with respect to an I-beam or the like. Drive mechanism 44 may be controlled by a console 28 for use in longitudinally advancing arm 16, as during coping, stripping and compound mitre cutting. Center or horizontal cutting torch 24 is vertically reciprocable by an air cylinder for a nine inch removal of the torch during cutting of the flanges by side or flange torches 22, 26. A lateral drive 66, 68 may be provided for independently repositioning of torches 22 and 26 upon arm 16. Horizontal or flange cutting torches 22, 26 also embody, as illustrated in FIG. 7, the vertical drive consisting of rack 92, having rotatable rack guide 94. Thus, cutting torches 22, 26 may be raised and lowered for synchronous or dissynchronous positioning with respect to a structural member being cut. Complex cuts can be made, of course, by longitudinal advancing of cantilever arm 16, while raising or lowering horizontal cutting torches 22, 26. This capability is not suggested in the prior art.

As will be apparent, the present torch cutting machine is desiged to flame cut structural steel shapes and plates in straight line, geometric or intricate shapes. Solid state electronic tracer 20 may follow a black line or paper template 40, so as to automatically guide the torches, cutting at speeds which are infinitely variable from 2" to 30" per minute. Vertical cutting or web torch 24 and tracing unit 20 may be mounted upon yoke 43 which travels upon arm 16. Horizontal torches 22, 26 are moved by means of torch cable drive 78 mounted upon sprockets 80, 82. Automatic torch movement selectors 82, 84 are provided as an override, such that the torches may be moved left or right independently of each other. This drive of torch 78 is achieved by tracing head and torch movement drive assembly 74, which also drives sprocket chain 76 for movement of yoke 43.

The proposed unit is capable of cutting plate, web or both flanges of structural beams in a single operation. The torch cantilever arm 16 permits up to a full 45 degree mitre cut across the web of a structural steel beam up to 36 inches deep. The flanges of such a beam may then be cut without additional setup time. Torches 22, 24, 26 may be supplied with oxygen and gas via the single console 38 of gas gauges and regulators. Optional "high-low" is available for preheating which includes reduction of preheat gases from high to low flow once the torch cutting is begun. This capability saves gas, shortens starting time and minimizes slag. Simultaneous straight angle and compound mitre cuts have not been available in prior devices.

Torch cutting console 28 may include principal controls as follows:

1. Torch horizontal drive: reverse and forward (left flange torch, web torch, right flage torch)
2. Torch vertical drive
3. Tracer mode and override
4. Master speed control (lineal inches per minute)
5. Override for torch vertical control As will be apparent, the side torches may be independently vertically driven, or horizontally driven towards or away from each other independently of movement of vertical web torch 24. Also, a series of limit switches may be employed at the bottom of each torch cutting support, so as to position each torch with respect to the beam bottom. Cutting begins from the bottom up.

Manifestly, variations in structure may be employed without departing from the spirit and scope of invention as defined in the claims.

I claim:
1. In a torch cutting machine of the type adjustably supporting a plurality of cutting torches in juxtaposition with material being cut the combination of:
   A. A base pivotably supporting a cantilever cutting arm, said arm extending across the material being cut and;
   B. A first cutting torch and a second cutting torch independently suspended from said cantilever cutting arm, each torch including:
      (i) a lateral drive mechanism engagable with said arm, and
      (ii) a vertical drive mechanism adapted for raising and lowering each said torch with respect to said arm.

2. A torch cutting machine as in claim 1, further including a third middle torch adjustable suspended from said arm intermediate said two cutting torches and having independent drive means engagable with said arm.

3. A torch cutting machine as in claim 2, including a template supported upon said base and a tracing element mounted upon said arm, so as to engage said template.

4. A torch cutting machine as in claim 3, said cantilever cutting arm having an independent drive means engagable with said base, so as to drive said arm longitudinally with respect to said base.

5. A torch cutting machine as in claim 4, said base having a first track supporting a pivot and guide carriage and a second track supporting a protractor and said independent drive means, such that said cantilever cutting arm may be driven longitudinally while pivoted with respect to said first track and said second track.

6. A torch cutting machine as in claim 5, said first and second cutting torches being pivotable upon a horizontal axis, so as to address the sides of a material being cut.

7. A torch cutting machine as in claim 6, said independent drive means on said second track including a motorized carriage movable with said protractor upon said second track.

8. A torch cutting machine as in claim 1, said tracing element including an independent tracing drive means.

9. A torch cutting machine as in claim 5, in further combination with a longitudinal drive conveyor advancing material to be cut intermediate said first and second cutting torches.

10. A torch cutting machine as in claim 9, adapted for cutting both flanges and web of an I-beam structural member, said first and second torches being positionable at either side of said flanges, so as to address the flanges and said middle torch being positioned to address the central web of an I-beam.

11. A torch cutting machine as in claim 8, including a horizontal yoke slidably supported upon said arm, said middle torch member being supported at one end of said yoke and said tracer and tracing drive means being supported at the other end of said yoke such that said tracer guides movement of said middle torch.

12. A torch cutting machine as in claim 11, said vertical drive mechanism for said first and second torches including a rack and pinion mechanism independently energized.

* * * * *